United States Patent
Chiou

(10) Patent No.: US 8,288,667 B2
(45) Date of Patent: Oct. 16, 2012

(54) DOUBLE-PACKING CABLE AND FLEXIBLE CONDUIT GLAND

(75) Inventor: Jiun-Wei Chiou, Taipei County (TW)

(73) Assignee: AVC Industrial Corp., Taipei County (TW)

( * ) Notice: Subject to any disclaimer, the term of this patent is extended or adjusted under 35 U.S.C. 154(b) by 216 days.

(21) Appl. No.: 12/854,234

(22) Filed: Aug. 11, 2010

(65) Prior Publication Data

US 2012/0037416 A1 Feb. 16, 2012

(51) Int. Cl.
*H02G 3/18174* (2006.01)
(52) U.S. Cl. .......... 174/652; 174/655; 174/656; 248/56; 439/583; 277/602
(58) Field of Classification Search ................ 174/652, 174/655, 656; 248/56, 73; 439/583; 277/602
See application file for complete search history.

(56) References Cited

U.S. PATENT DOCUMENTS

| | | | | |
|---|---|---|---|---|
| 4,739,126 A * | 4/1988 | Gutter et al. | ..................... | 174/78 |
| 6,300,569 B1 * | 10/2001 | Mullen, Jr. | ..................... | 174/655 |
| 6,409,179 B1 * | 6/2002 | Daoud | ..................... | 277/602 |
| 7,874,871 B2 * | 1/2011 | Montena | ..................... | 439/583 |
| 8,129,633 B1 * | 3/2012 | Shemtov | ..................... | 174/652 |

* cited by examiner

*Primary Examiner* — Dhirubhai R Patel
(74) *Attorney, Agent, or Firm* — Ming Chow; Sinorica, LLC

(57) ABSTRACT

A double-packing cable and flexible conduit gland for securing a cable and a flexible conduit to a box member, including a casing having a tapered inner surface portion and a first outer thread, a packing member inserted into the casing and defining a first packing segment compressible to clamp on the flexible conduit, a second packing segment compressible to clamp on the cable, an annular retaining rib protruded from an inside wall thereof for engaging the grooved periphery of the flexible conduit and a beveled end edge located on one end of the first packing segment remote from the second packing segment, and a holding-down cap threaded onto the first outer thread of the casing to hold down the packing member on the flexible conduit and the cable together and having a beveled edge disposed on the inside and stopped against the beveled end edge of the packing member.

8 Claims, 4 Drawing Sheets

DOUBLE-PACKING CABLE AND FLEXIBLE CONDUIT GLAND

BACKGROUND OF THE INVENTION

1. Field of the Invention

The present invention relates to a double-packing cable and flexible conduit gland and more particularly, to a double-packing cable and flexible conduit gland, which provides a double-packing effect to lock the installed cable and flexible conduit, exhibiting excellent waterproof effects.

2. Description of the Related Art

A flexible conduit may be used and mounted around a cable for protection against outside rainwater, dust or vermin. However, the cable may be disconnected or loosened from the connector or gland when stretched accidentally by an external force, causing leakage. To avoid this problem, a flexible conduit gland shall be used. A prior art design of flexible conduit gland is known comprising a casing, a lock nut, and a clamping ring set between the casing and the lock nut and adapted for seizing the flexible conduit. This design of cable gland allows quick mounting and dismounting of the flexible conduit.

The aforesaid prior art flexible conduit gland simply provides a single-point packing function to hold down the flexible conduit at a single point, however the clamping force produced by the cable gland is insufficient to lock the cable. When the cable is stretched accidentally by an external force, it may be disconnected. Further, this design of flexible conduit gland does not exhibit excellent waterproof effects.

Therefore, it is desirable to provide a flexible conduit gland, which eliminates the aforesaid problems.

SUMMARY OF THE INVENTION

The present invention has been accomplished under the circumstances in view. It is therefore the main object of the present invention to provide a double-packing cable and flexible conduit gland for securing a cable and a flexible conduit, which provides a double-packing effect to lock the cable and the flexible conduit firmly together, assuring high connection stability.

It is another object of the present invention to provide a double-packing cable and flexible conduit gland, which exhibits excellent waterproof effects.

To achieve these and other objects of the present invention, a double-packing cable and flexible conduit gland is adapted for securing a cable and a flexible conduit to a box member, comprising a casing, a packing member and a holding-down cap. The casing comprises a tapered inner surface portion located on an inside wall thereof and a first outer thread located on the periphery at one end thereof. The packing member is inserted into the casing, comprising a first packing segment compressible to clamp on the flexible conduit, a second packing segment compressible to clamp on the cable, an axial through hole extending through the first packing segment and the second packing segment for receiving the flexible conduit and the cable, a tapered outer surface located on the second packing segment and stopped against the tapered inner surface portion of the casing, at least one annular retaining rib protruded from an inside wall thereof and suspending in the axial through hole thereof for engaging the periphery of the flexible conduit and a beveled end edge located on one end of the first packing segment remote from the second packing segment. The holding-down cap is fastened to the casing to hold down the packing member on the flexible conduit and the cable, s comprising an axial through hole for the passing of the flexible conduit and the cable, a beveled edge disposed inside the axial through hole thereof and stopped against the beveled end edge of the packing member and an inner thread disposed in the axial through hole thereof and threaded onto the first outer thread of the casing.

Further, the second packing segment has an outer diameter and an inner diameter reducing gradually in direction away from the first packing segment.

Further, the packing member is made of an elastic material.

Further, the packing member comprises a plurality of at least one dent extending around the periphery of the second packing segment.

Further, the casing defines a first mounting segment, a second mounting segment and a stop flange located on a middle part thereof between the first mounting segment and the second mounting segment. The stop flange has an outer diameter greater than the first mounting segment and the second mounting segment. The first outer thread is located on the first mounting segment. The second mounting segment has a second outer thread located thereon for threading into a screw hole on a box panel/electrical junction box.

The double-packing cable and flexible conduit gland further comprises a gasket ring mounted around the second mounting segment of the casing and stopped at the stop flange of the casing. The gasket ring comprises a plurality of ribs concentrically raised from one side thereof and a positioning concave portion located on an opposite side thereof.

Further, the casing comprises a locating groove located on one side of the stop flange for the positioning of the positioning concave portion of the gasket ring.

Further, the flexible conduit has a plurality of grooves extending around the periphery thereof for the positioning of the at least one annular retaining rib of the packing member.

DETAILED DESCRIPTION OF THE PREFERRED EMBODIMENT

Figure 1:
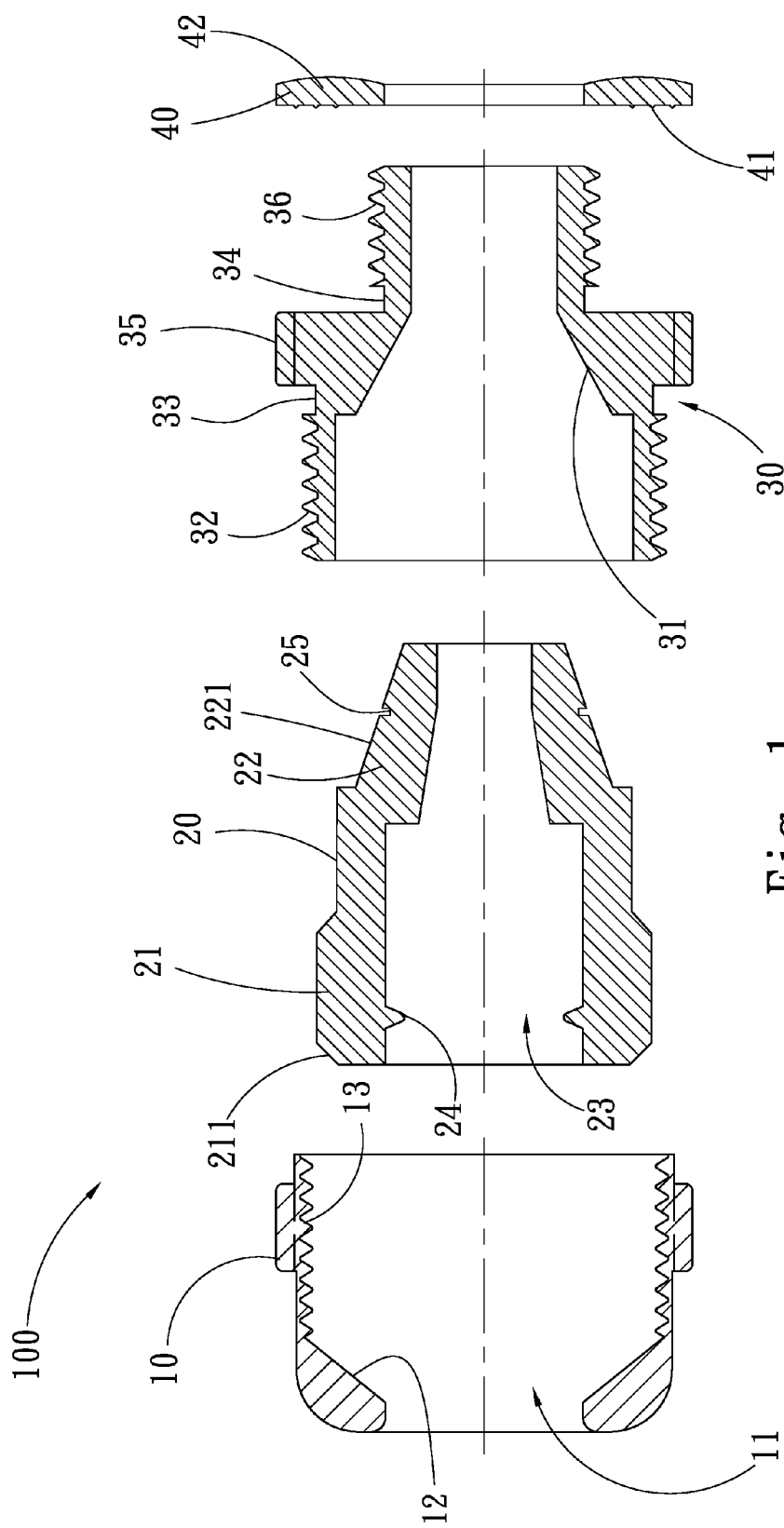
FIG. 1 is an exploded view in section of a double-packing cable and flexible conduit gland in accordance with the present invention.

The present invention provides a double-packing cable and flexible conduit gland that uses a tapered rubber packing member to secure a flexible conduit and a cable together and an elastic packing ring to engage the flexible conduit, avoiding disconnection or relative displacement between the flexible conduit and the cable and achieving IP-68 waterproof rating.

Referring to FIGS. 1~4, a double-packing cable and flexible conduit gland 100 in accordance with the present invention is shown for securing a flexible conduit 97 and a cable 98; 99 together, comprising a casing 30, a packing member 20 and a holding-down cap 10.

Referring to FIGS. 1 and 2 again, the holding-down cap 10 comprises an axial through hole 11, a beveled edge 12 located on the inside wall thereof around the axial through hole and an inner thread 13 extending around the inside wall at a front side relative to the beveled edge 12.

Referring to FIGS. 1 and 2 again, the packing member 20 is made of an elastic material, such as rubber, plastics or silicon rubber, comprising a first packing segment 21, a second packing segment 22 axially extended from the first packing segment, a tapered outer surface 221 formed on the periphery of the second packing segment 22 and reducing in outer diameter in direction away from the first packing segment 21, a beveled end edge 211 located on one end of the first packing segment 21 remote from the second packing segment 22, an axial through hole 23 axially extending through the first packing segment 21 and the second packing segment 22, and an annular retaining rib 24 extending around the inside wall of the first packing segment 21 and suspending in the axial through hole 23. Further, the second packing segment 22 has an outer diameter and an inner diameter reducing gradually in direction away from the first packing segment 21.

Referring to FIGS. 1 and 2 again, the casing 30 is a hollow cylindrical member having a tapered inner surface portion 31 located on the inside wall thereof on the middle and a first outer thread 32 extending around the periphery.

After understanding of the structural details of the component parts of the double-packing cable and flexible conduit gland 100, the installation of the double-packing cable and flexible conduit gland 100 is described hereinafter.

Figure 2:
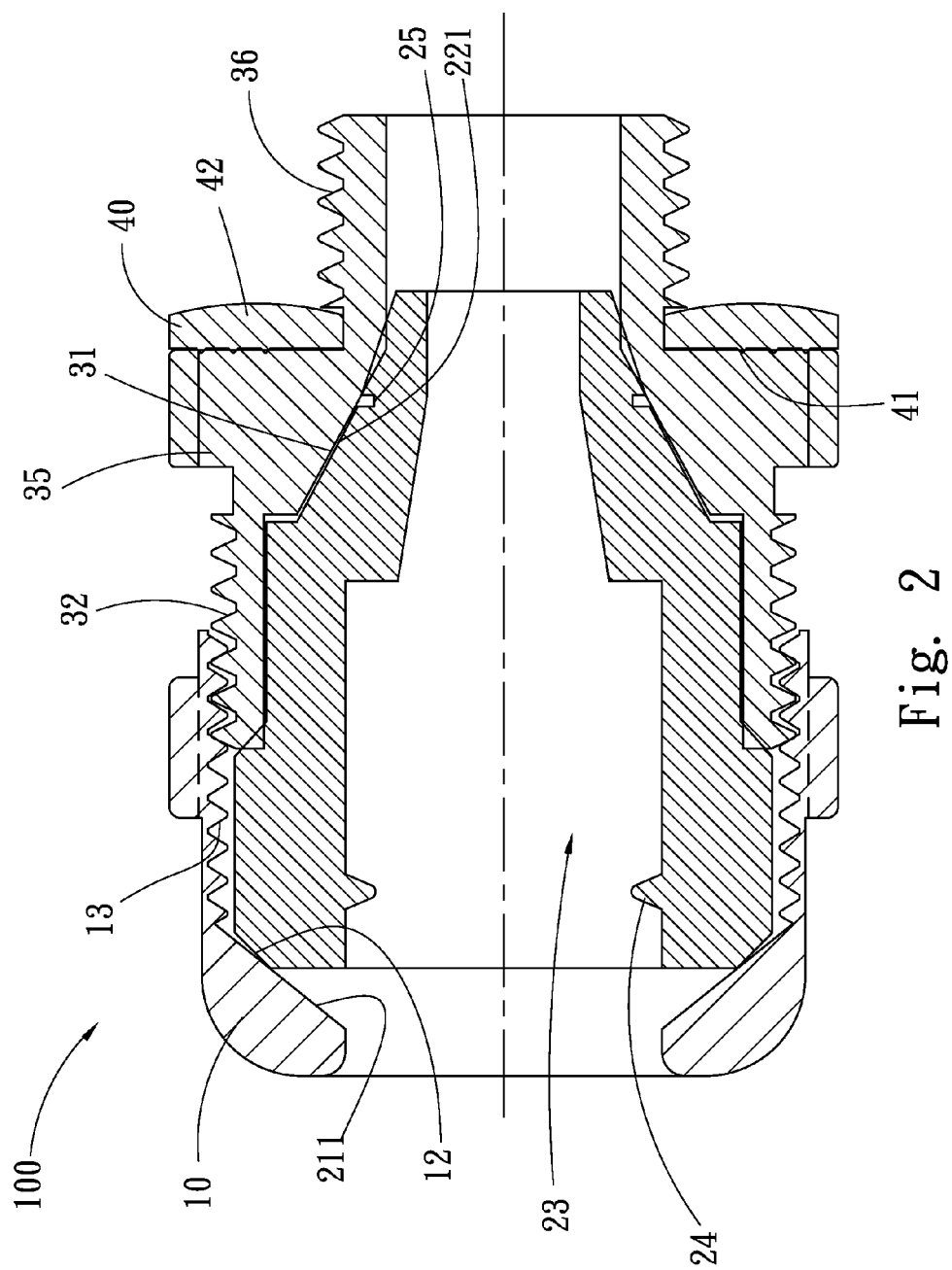
FIG. 2 is a sectional assembly view, in an enlarged scale, of the double-packing cable and flexible conduit gland shown in FIG. 1.

At first, as shown in FIG. 2, insert the first packing segment 21 of the packing member 20 into the axial through hole 11 of the holding-down cap 10, and then insert the second packing segment 22 of the packing member 20 into the inside of the casing 30, and then thread the inner thread 13 of the holding-down cap 10 onto the first outer thread 32 of the casing 30 to force the tapered outer surface 221 of the second packing segment 22 of the packing member 20 against the tapered inner surface portion 111 of the casing 10 and to stop beveled end edge 211 of the first packing segment 21 of the packing member 20 against the beveled edge 12 of the holding-down cap 10.

Figure 3:
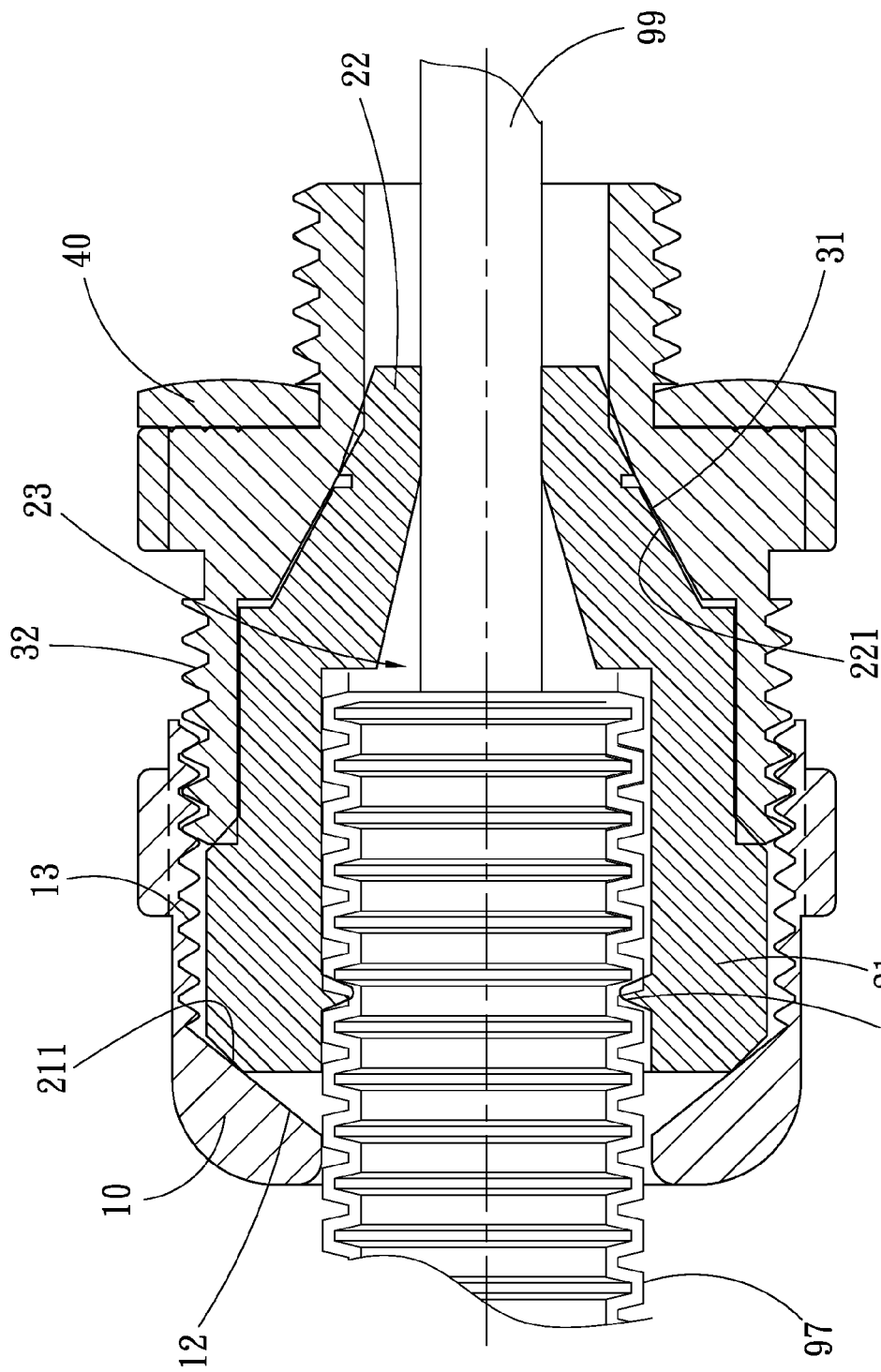
FIG. 3 is a schematic sectional view of the present invention, showing the double-packing cable and flexible conduit gland used with a flexible conduit and a small-diameter cable.
Figure 4:
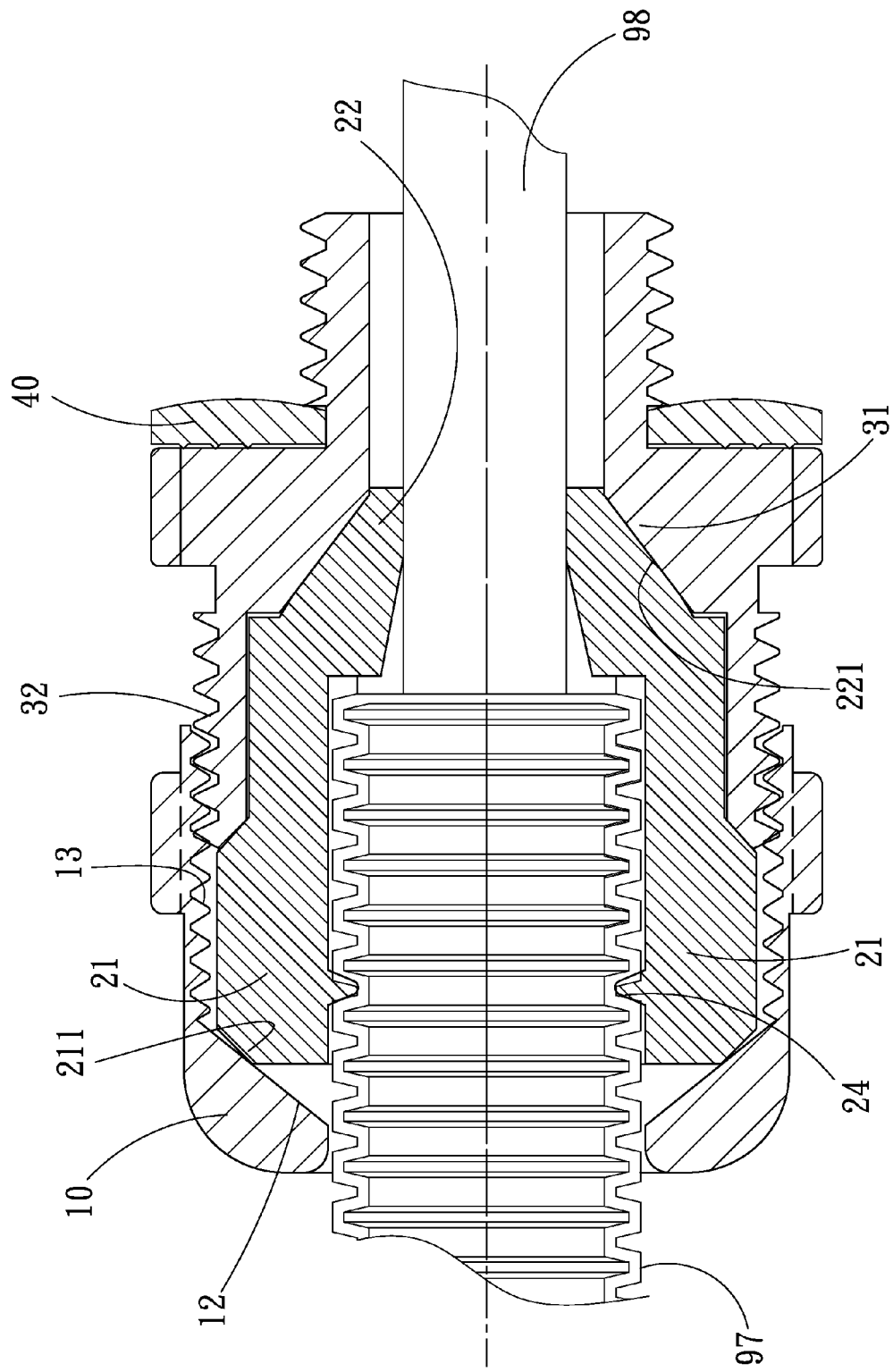
FIG. 4 is a schematic sectional view of the present invention, showing the double-packing cable and flexible conduit gland used with a flexible conduit and a big-diameter cable.

Thus, as shown in FIG. 3, when using the double-packing cable and flexible conduit gland 100 with a flexible conduit 97 and a small diameter cable 99, insert the cable 99 through the axial through hole 11 of the holding-down cap 10 and the axial through hole 23 of the packing member 20 to let the front end of the cable 99 be extended out of the flexible conduit 97 and suspending in the second packing segment 22 of the packing member 20 and the front end of the flexible conduit 97 be suspending in the first packing segment 21 of the packing member 20. When locking the cable 99 and the flexible conduit 97, fasten tight the holding-down cap 10 (rotate the holding-down cap 10 in direction toward the casing 30) to force the beveled edge 12 of the holding-down cap 10 against the beveled end edge 211 of the packing member 20, thereby holding down the first packing segment 21 of the packing member 20 on the flexible conduit 97. At this time, the packing member 20 is flexibly deformed to force the annular retaining rib 24 into engagement with the grooved periphery of the flexible conduit 97, achieving a primary packing effect. When continuously threading the inner thread 13 of the holding-down cap 10 onto the first outer thread 32 of the casing 30, the tapered outer surface 221 of the second packing segment 22 is moved forwardly along the tapered inner surface portion 31 of the casing 30 and forced by the tapered inner surface portion 31 to clamp on the periphery of the cable 99, achieving a secondary packing effect.

Thus, the first packing segment 21 and second packing segment 22 of the packing member 20 are forced to clamp the flexible conduit 97 and the cable 99 respectively, achieving a double-packing effect and avoiding disconnection of the cable 99 when stretched by an external force. When compared with the prior art design, the invention uses one single packing member 20 to achieve the desired double packing effect, assuring locking stability. Further, as stated above, the first packing segment 21 has an outer diameter greater than the second packing segment 22. When compared with the clamping ring of the prior art design, the wide area of the beveled end edge 211 of the first packing segment 21 can receive the pressure from the holding-down cap 10 efficiently, enabling the first packing segment 21 and second packing segment 22 of the packing member 20 to be compressed and wrapped about the flexible conduit 97 and the cable 99 firmly. Further, the tapered design of the second packing segment 22 enables the second packing segment 22 to be effectively compressed and clamped on the periphery of the cable 99, achieving a better locking effect over the prior art design.

Further, the packing member 20 has at least one dent 25 extending around the periphery of the tapered outer surface 221 of the second packing segment 22. For locking a cable 98 that has a relatively greater outer diameter, cut off the front part of the second packing segment 22 of the packing member 20 along the dent 25 so that the diameter of the front end of the well-cut second packing segment 22 of the packing member 20 becomes relatively greater for accommodating a relatively thicker cable 98. Thus, the packing member 20 can fit cables of different diameters.

Further, the casing 30 defines a first mounting segment 33, a second mounting segment 34 and a stop flange 35 located on the middle between the first mounting segment 33 and the second mounting segment 34. The stop flange 35 has an outer diameter greater than the first mounting segment 33 and the second mounting segment 34. The aforesaid first outer thread 32 is located on the first mounting segment 33 and adapted for threading into the holding-down cap 10. The casing 30 further comprises a second outer thread 36 located on the second mounting segment 34 and adapted for threading into a screw hole on a box panel or electrical junction box.

The double-packing cable and flexible conduit gland 100 further comprising a gasket ring 40 prepared from an elastically deformable material, such as rubber, plastics or silicon rubber, as shown in FIGS. 1 and 2. The gasket ring 40 is sleeved onto the second mounting segment 34 of the casing 30 and stopped at one side of the stop flange 35. When the second outer thread 36 is threaded into a screw hole on a box panel or electrical junction box, the gasket ring 40 is squeezed in between the stop flange 35 and the box panel or electrical junction box (not shown) to seal the gap against outside rainwater.

Further, the gasket ring 40 has endless ribs 41 concentrically protruded from one side thereof and a positioning concave portion 42 located on the other side thereof. After installation, the endless ribs 41 of the gasket ring 40 are stopped against the stop flange 35 of the casing 30, and the positioning concave portion 42 of the gasket ring 40 is engaged into a locating groove on the box panel or electrical junction box (not shown), achieving a better watertight effect. The use of the gasket ring 40 prevents sticking of the casing 30 in thee box panel or electrical junction box. Further, the stop flange 35 of the casing 30 can be made having a locating groove (not shown) located on one side thereof for the positioning of the positioning concave portion 42 of the gasket ring 40 when the gasket ring 40 is mounted on the second mounting segment 34 in the reversed direction.

Although a particular embodiment of the invention has been described in detail for purposes of illustration, various modifications and enhancements may be made without departing from the spirit and scope of the invention. Accordingly, the invention is not to be limited except as by the appended claims.

What the invention claimed is:

1. A double-packing cable and flexible conduit gland for securing a cable and a flexible conduit to a box member, comprising:

a casing, said casing comprising a tapered inner surface portion located on an inside wall thereof and a first outer thread located on a periphery at one end thereof;

a packing member inserted into said casing, said packing member comprising a first packing segment compressible to clamp on said flexible conduit, a second packing segment compressible to clamp on said cable, an axial through hole extending through said first packing segment and said second packing segment for receiving said flexible conduit and said cable, a tapered outer surface located on said second packing segment and stopped against the tapered inner surface portion of said casing, at least one annular retaining rib protruded from an inside wall of said first packing segment and suspending in the axial through hole thereof for engaging a periphery of said flexible conduit and a beveled end edge located on one end of said first packing segment remote from said second packing segment; and a holding-down cap fastened to said casing to hold down said packing member on said flexible conduit and said cable, said holding-down cap comprising an axial through hole for the passing of said flexible conduit and said cable, a beveled edge disposed inside the axial through hole of said holding-down cap and stopped against the beveled end edge of said packing member and an inner thread disposed in the axial through hole of said holding-down cap and threaded onto the first outer thread of said casing.

2. The double-packing cable and flexible conduit gland as claimed in claim 1, wherein said second packing segment has an outer diameter and an inner diameter reducing gradually in direction away from said first packing segment.

3. The double-packing cable and flexible conduit gland as claimed in claim 1, wherein said packing member is made of an elastic material.

4. The double-packing cable and flexible conduit gland as claimed in claim 1, wherein said packing member comprises a plurality of at least one dent extending around the periphery of said second packing segment.

5. The double-packing cable and flexible conduit gland as claimed in claim 1, wherein said casing defines a first mounting segment, a second mounting segment and a stop flange located on a middle part thereof between said first mounting segment and said second mounting segment, said stop flange having an outer diameter greater than said first mounting segment and said second mounting segment, said first outer thread being located on said first mounting segment; said second mounting segment having a second outer thread located thereon for threading into a screw hole on a box panel/electrical junction box.

6. The double-packing cable and flexible conduit gland as claimed in claim 5, further comprising a gasket ring mounted around said second mounting segment of said casing and stopped at said stop flange of said casing, said gasket ring comprising a plurality of ribs concentrically raised from one side thereof and a positioning concave portion located on an opposite side thereof.

7. The double-packing cable and flexible conduit gland as claimed in claim 6, wherein said casing comprises a locating groove located on one side of said stop flange for the positioning of the positioning concave portion of said gasket ring.

8. The double-packing cable and flexible conduit gland as claimed in claim 1, wherein said flexible conduit has a plurality of grooves extending around the periphery thereof for the positioning of said at least one annular retaining rib of said packing member.

\* \* \* \* \*